US007053157B2

(12) United States Patent
Sita et al.

(10) Patent No.: US 7,053,157 B2
(45) Date of Patent: May 30, 2006

(54) METHOD FOR PRODUCTION OF MULTIMODAL POLYOLEFINS OF TUNABLE COMPOSITION, MOLECULAR WEIGHT, AND POLYDISPERSITY

(75) Inventors: Lawrence R Sita, Silver Spring, MD (US); Richard J Keaton, Greenbelt, MD (US); Kumudini C Jayaratne, Bartelsville, OK (US)

(73) Assignee: University of Maryland, College Park, College Park, MD (US)

( * ) Notice: Subject to any disclaimer, the term of this patent is extended or adjusted under 35 U.S.C. 154(b) by 0 days.

(21) Appl. No.: 10/484,210

(22) PCT Filed: Jul. 19, 2002

(86) PCT No.: PCT/US02/22923

§ 371 (c)(1),
(2), (4) Date: Jan. 20, 2004

(87) PCT Pub. No.: WO03/008459

PCT Pub. Date: Jan. 30, 2003

(65) Prior Publication Data

US 2004/0198930 A1    Oct. 7, 2004

Related U.S. Application Data

(60) Provisional application No. 60/308,115, filed on Jul. 30, 2001, provisional application No. 60/306,799, filed on Jul. 20, 2001.

(51) Int. Cl.
*C08F 4/64* (2006.01)
*C08F 4/642* (2006.01)
*C08F 4/643* (2006.01)

(52) U.S. Cl. .......................... 526/86; 526/78; 526/79; 526/83; 526/87; 526/113; 526/114; 526/118; 526/119; 526/161; 526/172

(58) Field of Classification Search ................. 526/78, 526/79, 83, 86, 87, 65, 66, 113–119, 161, 526/172
See application file for complete search history.

(56) References Cited

U.S. PATENT DOCUMENTS

| 3,542,693 | A | 11/1970 | Price |
| 4,892,914 | A | 1/1990 | Hefner |
| 5,055,438 | A | 10/1991 | Canich |
| 5,057,475 | A | 10/1991 | Canich et al. |
| 5,132,380 | A | 7/1992 | Stevens et al. |
| 5,227,440 | A | 7/1993 | Canich et al. |
| 5,260,244 | A | 11/1993 | Pettijohn |
| 5,279,999 | A | 1/1994 | DeBoer et al. |
| 5,317,036 | A | 5/1994 | Brady, III et al. |
| 5,371,146 | A | 12/1994 | Takahashi et al. |
| 5,387,660 | A * | 2/1995 | Doyle et al. ............... 526/69 |
| 5,416,178 | A | 5/1995 | Winter et al. |
| 5,464,906 | A | 11/1995 | Patton et al. |
| 5,527,752 | A | 6/1996 | Reichle et al. |
| 5,648,438 | A * | 7/1997 | Henry et al. ............... 526/65 |
| 5,674,795 | A | 10/1997 | Wasserman et al. |
| 5,681,908 | A | 10/1997 | Mehra et al. |
| 5,912,202 | A | 6/1999 | Oskam et al. |
| 6,579,998 | B1 * | 6/2003 | Sita et al. ................. 556/53 |
| 2004/0110632 | A1 | 6/2004 | Sita et al. |
| 2004/0186253 | A1 | 9/2004 | Sita |

FOREIGN PATENT DOCUMENTS

EP      0 283 739      9/1988
WO      WO 87/03887    7/1987

OTHER PUBLICATIONS

Chien, J.C.W. et al., "Homogeneous Binary Zirconocenium Catalyst Systems for Propylene Polymerization. 1. Isotactic/Atactic Interfacial Compatibilized Polymers Having Thermoplastic Elastomeric Properties," *Macromolecules* 30:3447-3458, American Chemical Scoiety (1997).

Chien, J.C.W. et al., "Homogeneous Binary Zirconocenium Catalysts for Propylene Polymerization. II. Mixtures of Isospecific and Syndiospecific Zirconocene Systems," *J. Polym. Sci. Part A* 37:2439-2445, John Wiley & Sons, Inc. (1999).

Hlatky, G.G. et al., "Ionic, Base-Free Zirconocene Catalysts for Ethylene Polymerization," *J. Am. Chem. Soc.* 111:2728-2729, American Chemical Society (1989).

Jayaratne, K.C. and Sita, L.R., "Stereospecific Living Ziegler—Natta Polymerization of 1-Hexene," *J. Am. Chem. Soc.* 122:958-959, American Chemical Society (2000).

Jayaratne, K.C. et al., "Living Ziegler—Natta Cyclopolymerization of Nonconjugated Dienes: New Classes of Microphase-Separated Polyolefin Block Copolymers via a Tandem Polymerization/Cyclopolymerization Strategy," *J. Am. Chem. Soc.* 122:10490-10491, American Chemical Society (2000).

Jayaratne, K. C. and Sita, L. R., "Direct Methyl Group Exchange Between Cationic Zirconium Ziegler-Natta Initiators and Their Living Polymers: Ramifications for the Production of Stereoblock Polyolefins," *J. Am. Chem. Soc.* 123:10754-10755, American Chemical Society (2001).

(Continued)

*Primary Examiner*—Roberto Rabago
(74) *Attorney, Agent, or Firm*—Sterne, Kessler, Goldstein & Fox P.L.L.C.

(57) ABSTRACT

The present invention relates to a method of producing multimodal polyolefins using at least one or more activated metallocene catalysts. The activated metallocene catalysts are used in combination in a single-process method. The method allows for the production of multimodal polyolefins of tunable composition, molecular weight and polydispersity.

28 Claims, 4 Drawing Sheets

OTHER PUBLICATIONS

Keaton, R.J. et al., "Structural Characterization of Zirconium Cations Derived from a Living Ziegler—Natta Polymerization System: new Insights Regarding Propagation and Termination Pathways for Homogeneous Catalysts," *J. Am. Chem. Soc. 122*:12909-12910, American Chemical Society (2000).

Keaton, R.J. et al., "Dramatic Enhancement of Activities for Living Ziegler—Natta Polymerizations Mediated by 'Exposed' Zirconium Acetamidinate Initiators: The Isospecific Living Polymerization of Vinylcyclohexane," *J. Am. Chem. Soc. 123*:6197-6198, American Chemical Society (2001).

Lieber, S. and Brintzinger, H.-H., "Propene Polymerization with Catalyst Mixtures Containing Different *ansa*-Zirconocenes: Chain Transfer to Alkylaluminum Cocatalysts and Formation of Stereoblock Polymers," *Macromolecules 33*:9192-9199, American Chemical Society (2000).

Przybyla, C. and Fink, G., "Two different, on the same silica supported metallocene catalysts, activated by various trialkylaluminums—a kinetic and morphological study as well as an experimental investigation for building stereoblock polymers," *Acta Polym. 50*:77-83, Wiley-VCH Verlag GmbH (1999).

Sita, L.R. et al., "Mechanistic and Materialistic Aspects of Living Ziegler-Natta Polymerization by Amidinate-Based Catalysts," abstract from International Symposium on Olefin Metathesis (ISOM) XIV, Cambridge, MA, Aug. 5-9, 2001 (presented Aug. 8, 2001).

Sita, L.R. et al., "Mechanistic and Materialistic Aspects of Living Ziegler-Natta Polymerization by Amidinate-Based Catalysts," slides presented at International Symposium on Olefin Metathesis (ISOM) XIV, Cambridge, MA, Aug. 5-9, 2001 (presented Aug. 8, 2001).

International Search Report for International Patent Application No. PCT/US02/22923, 3 pages, mailed Oct. 3, 2002.

* cited by examiner

METHOD FOR PRODUCTION OF MULTIMODAL POLYOLEFINS OF TUNABLE COMPOSITION, MOLECULAR WEIGHT, AND POLYDISPERSITY

Part of the work performed during development of this invention utilized U.S. Government funds. The work was partly funded by National Science Foundation Grant CHE-0092493. The U.S. Government has certain rights in this invention.

BACKGROUND OF THE INVENTION

1. Field of the Invention

The present invention relates to a novel method of olefin polymerization which allows for the production of multimodal polyolefins of tunable composition, molecular weight, and polydispersity.

2. Background Art

Polymeric materials that are multimodal in molecular weight distribution (MWD), composition, or microstructure have distinct advantages over the corresponding traditional monomodal materials. And while multimodal materials hold much promise for advances in polymer chemistry, the problems associated with their preparation have limited their use.

Homogenous high molecular weight (HMW) polyethylene has promise in many applications. It combines low cost with good mechanical properties such as high strength and durability. This material, however, is difficult to process and mold due to its high melt-temperature and poor Theological properties. To solve this problem, HMW polyethylene is formulated with plasticizers to increase its processability. The use of plasticizers drives up the cost of producing the material and limits its utility because of phase separation problems. Polyethylene that is multimodal in molecular weight inherently has a lower melt transition temperature and improved Theological properties that makes it easier to process. Because the composition contains no additives, there is no problem with phase-separation. Importantly, multimodal polyethylene maintains the same mechanical properties of the HMW material.

The preparation of multimodal polyolefins has been problematic, thus limiting their application. Mixed catalyst systems have been used to prepare materials that have broad MWD but the process is difficult to control and the outcome difficult to predict. Another method to prepare polymers of broad or multimodal MWD utilizes separate reactors or blends of separate polymers of different MWD. These methods increase production costs and are often plagued by incomplete mixing, which can give rise to polymer phase separation. A single-process method that is reliable, cost-effective, and predictable for preparing multimodal homogeneous polyolefins is needed.

Block copolymers with multimodal MWD, in particular, hold great technological promise. These materials may combine the fluictionality of two distinctly different polymer microstructures with the advantages of a multimodal MWD. Hybrid materials, such as thermoplastic elastomers, maintain good mechanical properties and good processability.

A particularly useful class of block copolymers is the stereoblock polyolefins. One method for their preparation is disclosed in J. C. Chien, et al., *Macromolecules* 30:3447–3458 (1997), and relies upon the use of mixtures of zirconocene catalysts that manifest different stereoselectivities during propagation (e.g., isotactic and atactic) so that a stereoblock microstructure will result. See also: J. C. Chien, et al., *J. Polym. Sci. Part A* 37:2439–2445 (1999); C. Przybyla, et al., *Acta Polym.* 50:77–83 (1999); and S. Lieber and H. H. Brintzinger, *Macromolecules* 33:9192–9199 (2000). These methods do not, however, lead to multimodal materials. These methods further suffer from the same drawbacks mentioned above when using mixed catalyst systems. A single-process method that is reliable, cost-effective and predictable for preparing multimodal stereoblock polyolefins is needed.

BRIEF SUMMARY OF THE INVENTION

In one embodiment the present invention relates to a method of producing a multimodal polyolefin composition comprising contacting at least one first olefin monomer with at least one first metallocene catalyst; polymerizing said at least one first monomer with said at least one catalyst for a time sufficient to give a polymer; adding at least one second metallocene catalyst and at least one second olefin monomer; and polymerizing said second monomer with said second catalyst and said first polymer, for a time sufficient to give a multimodal polyolefin.

BRIEF DESCRIPTION OF THE DRAWINGS/FIGURES

DETAILED DESCRIPTION OF THE INVENTION

Figure 1:
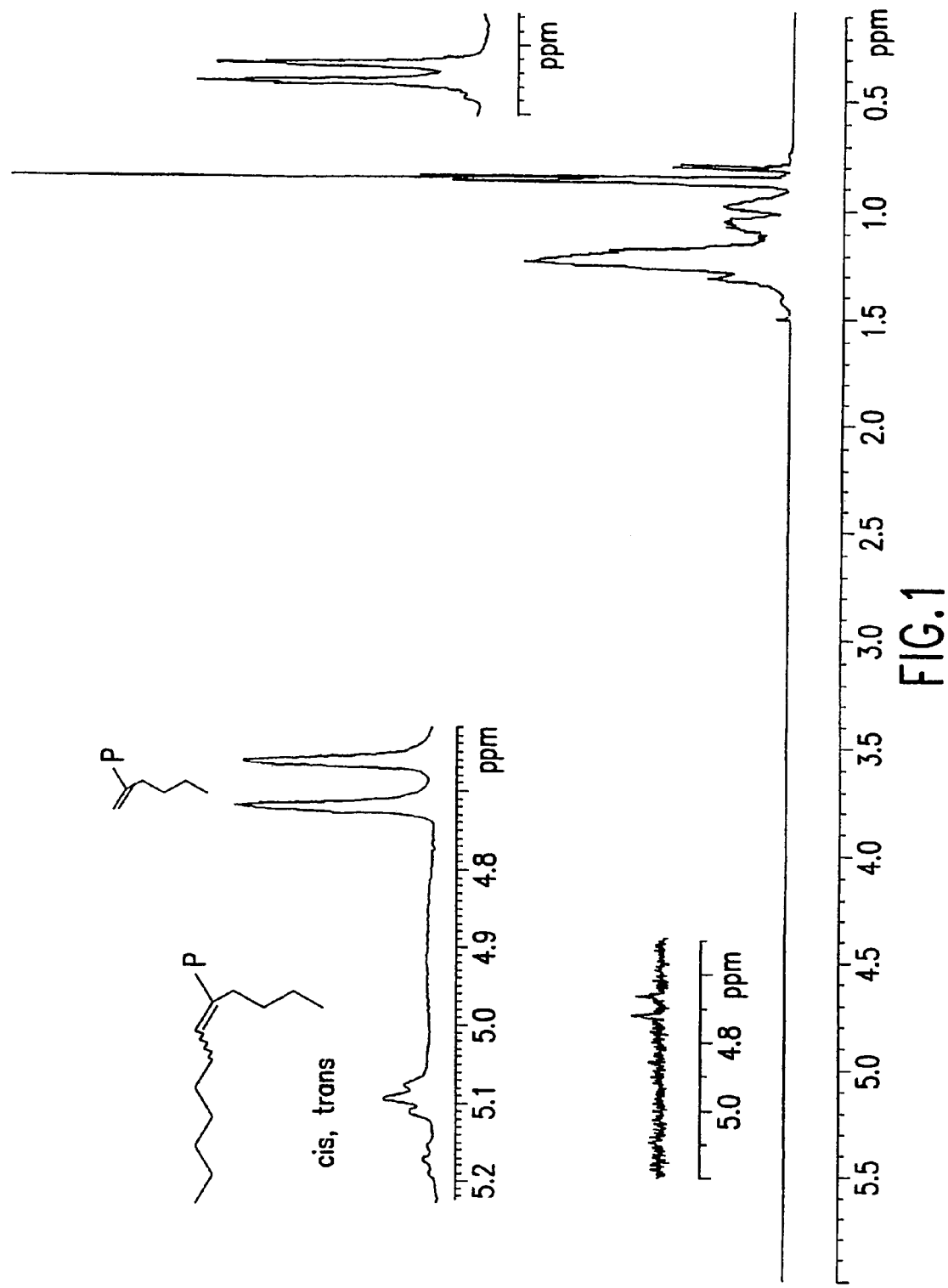
FIG. 1 shows a $^1$H-NMR (500 MHz, CDCl$_3$) spectrum of apoly(1-hexene) sample ($M_n$=1690, PDI=1.06).

The present invention relates to a novel method of olefin polymerization promoted by activated metallocene catalysts. The method allows for the production of multimodal polyolefins of tunable composition, molecular weight, and polydispersity. The method allows for the production of multimodal polyolefins in a single step polymerization process promoted by a combination of activated metallocene catalysts.

"Multimodal in molecular weight distribution" (MWD) is used here to mean a composition of polymers that contains at least two or more distinct molecular weight distributions. Preferably, the present invention relates to the production of bimodal polyolefins. Alternatively, the present invention relates to the production of trimodal polyolefins. Typically, the MWD is a range of molecular weights that may range in a number average molecular weight ($M_n$) of about 5 kDa to about 500,000 kDa. The MWD of a polymer can be measured using a variety of techniques including, but not limited to, size exclusion chromatography and gel permeation chromatography (GPC).

"Stereospecific polymerization" is used here to mean a polymerization in which a tactic or stereoregular polymer is formed. Polymerization in which stereoisomerism is present in the monomer and is merely retained in the polymer is not regarded as stereospecific (IUPAC Compendium of Chemical Technology, 2$^{nd}$ Ed. 1997). The extent to which a polymerization is stereospecific can be measured using a variety of techniques including, but not limited to carbon ($^{13}$C NMR) nuclear magnetic resonace spectroscopy.

A stereoregular macromolecule is understood to be a macromolecule that comprises only one species of stereorepeating unit. Examples include, but are not limited to, an isotactic macromolecule, a syndiotactic macromolecule, and an atactic macromolecule. A stereoblock macromolecule is understood to be a block macromolecule composed of at least one or more stereoregular, and possibly, non-stereoregular blocks. An example is isotactic-poly(propylene)-block-atactic-poly(propylene).

"Metallocene" is used here to mean any organometallic coordination complex containing at least one or more π-bonded ligands coordinated with a metal atom from Groups IIIB to VIII or the Lanthanide series of the Periodic Table of the Elements. An example of a π-bonded ligand is the cyclopentadienyl ring. Examples of the metal atoms are the metals of Group IVB such as titanium, zirconium or hafinium.

Monomers that can be used in the present invention include, but are not limited to straight-chain or branched aliphatic α-olefins with 2 to 12 carbons, such as ethylene, 1-propene, 1-butene, 1-pentene, 1-hexene, 1-heptene, 1-octene, 1-decene, 3-methylbutene, 3-methyl-1-pentene and 4-methyl-1-pentene; cycloaliphatic olefin containing carbon and heteroatom substituted compounds such as vinylcyclohexane, vinylcyclobutane, vinylcyclopentane, vinylcyclooctane, cyclohexene and vinyl pyrrolidone; dienes such as 1,3-butadiene, 1,5-hexadiene, 5-vinyl-2-norbomene, 1,7-octadiene, and others; vinyl substituted aromatic and heteroaromatic compounds such as styrene, aryl-substituted styrene and vinyl pyridine; and enantiomerically pure α-olefins such as β-citronellene.

Metallocene catalysts that are contemplated for use in the present invention include any metallocene catalyst that can initiate the polymerization of an olefin monomer. Preferred metallocene catalysts include single-site metallocene catalysts such as those disclosed in Hlatky, et al., *J. Am. Chem. Soc.* 111:2728–2729 (1989); K. C. Jayaratne, et al., *J. Am. Chem. Soc.* 122:958–959 (2000); K. C. Jayaratne, et al., *J. Am. Chem. Soc.* 122:10490–10491 (2000); R. J. Keaton, et al., *J. Am. Chem. Soc.* 122:12909–12910 (2000); R. J. Keaton, et al., *J. Am. Chem. Soc.* 123:6197–6198 (2001); U.S. Pat. No. 4,892,914; U.S. Pat. No. 5,055,438; U.S. Pat. No. 5,057,475; U.S. Pat. No. 5,132,380; U.S. Pat. No. 5,227,440; U.S. Pat. No. 5,260,244; U.S. Pat. No. 5,279,999; U.S. Pat. No. 5,371,146; U.S. Pat. No. 5,416,178; U.S. Pat. No. 5,464,906; U.S. Pat. No. 5,527,752; U.S. Pat. No. 5,912,202; EP 283,739; and WO 87/03887.

In one embodiment of the invention, multimodal polyolefins are prepared using at least one or more metallocene pre-catalysts, which are bridged and unbridged mono-, di-, and tri-cycloalkadienyl-metal complexes, and generally have the structure of formula (I):

$$(L)_y R^1 = (L')MX_{(x-y-1)} \quad (I)$$

wherein M is a metal from groups IIIB to VIII or a rare earth metal of the Periodic Table; L and L' are the same or different and are π-bonded ligands coordinated to M, preferably cycloalkadienyl groups such as cyclopentadienyl, indenyl, or fluorenyl groups optionally substituted with one or more hydrocarbon groups containing 1 to 20 carbon atoms; $R^1$ is selected from the group consisting of $C_1$–$C_6$ substituted or unsubstituted alkylene radicals, dialkyl or diaryl germanium or silicon groups, and alkyl or aryl phosphine or amine radicals bridging L and L'; each X is independently hydrogen, an alkyl, alkenyl, aryl, alkylaryl, or arylalkyl radical having 1–20 carbon atoms, a hydrocarboxy radical having 1–20 carbon atoms; y is 0, 1, or 2; x is 1, 2, 3, or 4 depending upon the valence state of M; z is 0 or 1 and is 0 when y is 0; and x–y≧1.

Illustrative but non-limiting examples of metallocene pre-catalysts represented by formula (I) are dialkyl metallocenes such as bis(cyclopentadienyl)titanium dimethyl, bis(cyclopentadienyl)titanium diphenyl, bis(cyclopentadienyl)zirconium dimethyl, bis(cyclopentadienyl)zirconium diphenyl, bis(cyclopentadienyl)hafnium methyl and diphenyl, bis(cyclopentadienyl)titanium di-neopentyl, bis(cyclopentadienyl)zirconium di-neopentyl, bis(cyclopentadienyl) titanium dibenzyl, bis(cyclopentadienyl)zirconium dibenzyl, bis(cyclopentadienyl)vanadium dimethyl; the mono alkyl metallocenes such as bis(cyclopentadienyl)titanium methyl chloride, bis(cyclopentadienyl)titanium ethyl chloride, bis(cyclopentadienyl)titanium phenyl chloride, bis(cyclopentadienyl)zirconium methyl chloride, bis(cyclopentadienyl)zirconium ethyl chloride, bis(cyclopentadienyl)zirconium phenyl chloride, bis(cyclopentadienyl)titanium methyl bromide; the trialkyl metallocenes such as cyclopentadienyl titanium trimethyl, cyclopentadienyl zirconium triphenyl, and cyclopentadienyl zirconium trineopentyl, cyclopentadienyl zirconium trimethyl, cyclopentadienyl hafnium triphenyl, cyclopentadienyl hafnium trineopentyl, and cyclopentadienyl hafnium trimethyl; monocyclopentadienyl titanocenes such as pentarnethylcyclopentadienyl titanium trichloride, pentaethylcyclopentadienyl titanium trichlioride, bis(pentamethylcyclopentadienyl)titanium diphenyl; the carbene represented by the formula bis(cyclopentadienyl)titanium=CH2 and derivatives of this reagent; substituted bis(cyclopentadienyl)titanium (IV) compounds such as bis(indenyl)titanium diphenyl or dichloride, bis (methylcyclopentadienyl)titanium diphenyl or dihalides; dialkyl, trialkyl, tetraalkyl and pentaalkyl cyclopentadienyl titanium compounds such as bis(1,2-dimethylcyclopentadienyl)titanium diphenyl or dichloride, bis(1,2-diethylcyclopentadienyl)titanium diphenyl or dichloride; silicon, phosphine, amine or carbon bridged cyclopentadiene complexes such as dimethyl silyldicyclopentadienyl titanium diphenyl or dichloride, methyl phosphine dicyclopentadienyl titanium diphenyl or dichloride, methylenedicyclopentadienyl titanium diphenyl or dichloride and other dihalide complexes, and the like, as well as isopropyl(cyclopentadienyl)(fluorenyl)zirconium dichloride, isopropyl(cyclopentadienyl) (octahydrofluorenyl)zirconium dichloride, diphenylmethylene(cyclopentadienyl)(fluorenyl)zirconium dichloride, diisopropylmethylene(cyclopentadienyl)(fluorenyl)zirconium dichloride, diisobutylmethylene(cyclopentadienyl) (fluorenyl)zirconium dichloride, ditertbutylmethylene(cyclopentadienyl)(fluorenyl)zirconium dichloride, cyclohexylidene(cyclopentadienyl)(fluorenyl)zirconium dichloride, diisopropylmethylene(2,5-dimethylcyclopentadienyl)(fluorenyl)zirconium dichloride, isopropyl(cyclopentadienyl)(fluorenyl)hafnium dichloride, diphenylmethylene (cyclopentadienyl)(fluorenyl)hafnium dichloride, diisopropylmethylene(cyclopentadienyl)(fluorenyl)hafnium dichloride, diisobutylmethylene(cyclopentadienyl)(fluorenyl)hafnium dichloride, ditertbutylmethylene(cyclopentadienyl)(fluorenyl)hafnium dichloride, cyclohexylidene(cyclopentadienyl)(fluorenyl)hafnium dichloride, diisopropylmethylene(2,5-dimethylcyclopentadienyl)(fluorenyl)hafnium dichloride, isopropyl(cyclopentadienyl)(fluorenyl)titanium dichloride, diphenylmethylene(cyclopentadienyl)(fluorenyl)titanium dichloride, diisopropylmethylene (cyclopentadienyl)(fluorenyl)titanium dichloride, diisobutylmethylene(cyclopentadienyl)(fluorenyl)titanium dichloride, ditertbutylmethylene(cyclopentadienyl)(fluorenyl)titanium dichloride, cyclohexylidene(cyclopentadienyl) (fluorenyl)titanium dichloride, diisopropylmethylene(2,5-dimethylcyclopentadienyl)(fluorenyl)titanium dichloride, racemic-ethylene bis(1-indenyl)zirconium (IV) dichloride, racemic-ethylene bis(4,5,6,7-tetrahydro-1-indenyl)zirconium (IV) dichloride, racemic-dimethylsilyl bis(1-indenyl) zirconium (IV) dichloride, racemic-dimethylsilyl bis(4,5,6,7-tetrahydro-1-indenyl)zirconium (IV) dichloride, racemic-1,1,2,2-tetramethylsilanylene bis(1-indenyl)zirconium (IV) dichloride, racemic-1,1,2,2-tetramethylsilanylene bis(4,5,6,7-tetrahydro-1-indenyl)zirconium (IV), dichloride, ethylidene (1-indenyl-tetramethylcyclopentadienyl)zirconium (IV) dichloride, racemic-dimethylsilyl bis(2-methyl-4-t-butyl-1-cyclopentadienyl)zirconium (IV) dichloride, racemic-ethylene bis(1-indenyl)hafnium (IV) dichloride, racemic-ethylene bis(4,5,6,7-tetrahydro-1-indenyl)hafnium (IV) dichloride, racemic-dimethylsilyl bis(1-indenyl)hafnium (IV) dichloride, racemic-dimethylsilyl bis(4,5,6,7-tetrahydro-1-indenyl)hafnium (IV) dichloride, racemic-1,1,2,2-tetramethylsilanylene bis(1-indenyl)hafnium (IV) dichloride, racemic-1,1,2,2-tetramethylsilanylene bis(4,5,6,7-tetrahydro-1 indenyl)hafnium (IV), dichloride, ethylidene (1-indenyl-2,3,4,5-tetramethyl-1-cyclopentadienyl)hafnium (IV) dichloride, racemic-ethylene bis(1-indenyl)titanium (IV) dichloride, racemic-ethylene bis(4,5,6,7-tetrahydro-1-indenyl)titanium (IV) dichloride, racemic-dimethylsilyl bis(1-indenyl)titanium (IV) dichloride, racemic-dimethylsilyl bis(4,5,6,7-tetrahydro-1-indenyl)titanium (IV) dichloride, racemic-1,1,2,2-tetramethylsilanylene bis(1-indenyl)titanium (IV) dichloride racemic-1,1,2,2-tetramethylsilanylene bis(4,5,6,7-tetrahydro-1-indenyl)titanium (IV) dichloride, and ethylidene (1-indenyl-2,3,4,5-tetramethyl-1-cyclopentadienyl)titanium (IV) dichloride, (N-tert-butylamido)(dimethyl)(tetramethyl-$\eta^5$-cyclopentadienyl)silane scandium hydride triphenylphosphine dimer, (n-tert-butylamido)(dimethyl)(tetramethyl-$\eta^5$-cyclopentadienyl)silane scandium hydride, (2,5-dimethyltetrahydrofuran)(N-tert-butylamido)(dimethyl)(tetramethyl-$\eta^5$-cyclopentadienyl)silane scandium bis(trimethylsilyl)methyl, (N-phenylamido)(dimethyl) (tetramethyl-$\eta^5$-cyclopentadienyl)silane scandium bis (trimethyl)methyl, (N-secbutylamido)(dimethyl) (tetramethyl-$\eta^5$-cyclopentadienyl)silane scandium bis (trimethylsilyl)methyl, (N-tert-butylamido)(dimethyl) (tetramethyl-$\eta^5$-cyclopentadienyl)silane scandium methyltribenzylphosphine, (N-tert-butylamido)(dimethyl) (tetramethyl-$\eta^5$-cyclopentadienyl)silane scandium methyl, (2,5-dimethyltetrahydrofuran)(N-tert-butylamido)(dimethyl)(tetramethyl-$\eta^5$-cyclopentadienyl)silane scandium benzyl triphenylphosphine, (N-tert-butylamido)(dimethyl) (fluorenyl)silane scandium hydride triphenylphisphine, (N-sec-dodecylamido)(dimethyl) (fluorenyl)silane scandium hydride, (2,5-dimethyltetrahydrofuran)(N-butylamido) (dimethyl)(tetramethyl-$\eta^5$-cyclopentadienyl)silane scandium bis(trimethylsilyl)methyl, (N-tert-butylphospho) (dimethyl)(tetramethyl-$\eta^5$-cyclopentadienyl)silane scandium bis(trimethyl-$\eta^5$-cyclopentadienyl)silane scandium bis (trimethylsilyl)methyl, (N-tert-butylamido)(dimethyl) (octahydrofluorenyl)silane scandium methyltriphenylphosphine, (N-tert-butylamido)(dimethyl) (indenyl)silane scandium methyl (2,5-dimethyltetrahydrofuran, and (N-tert-butylamido)(dimethyl)(tetrahydroindenyl) silane scandium 2-(N,N-dimethylamino)dibenzyl triphenylphosphine.

Additional metal complexes containing yttrium as well as complexes containing other ligand groups will be readily apparent to the skilled artisan.

In a preferred embodiment of the present invention, multimodal polyolefins are prepared using at least one or more amidinate-based pre-catalysts, having a structure described by formula (II):

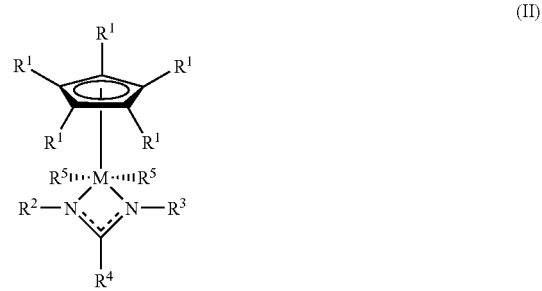

wherein the dotted lines indicate a delocalized bond;

M is Ti, Zr or Hf;

each $R^1$ is independently hydrogen or alkyl or two adjacent $R^1$ form an aromatic ring;

each $R^2$, $R^3$ and $R^4$ is independently alkyl, cycloalkyl, Si(alkyl)$_3$, Si(aryl)$_3$, optionally substituted Si(aryl)$_3$, phenyl, optionally substituted phenyl, alkylphenyl or optionally substituted alkylphenyl; or one $R^1$ and one of $R^2$, $R^3$ and $R^4$ together form an alkyl, aryl, arylalkyl or alkylarylalkyl bridge; and each $R^5$ is alkyl, cycloalkyl, aryl, optionally substituted aryl, arylalkyl or optionally substituted arylalkyl;

with an activating co-catalyst having the formula:

$$[A]^+[B(R^6)_4]^- \text{ or } B(R^6)_3$$

wherein $A^+$ is a cationic Lewis or Brønsted acid capable of abstracting a methyl from the metal, M, of the olefin polymerization pre-catalyst;

B is the element boron; and $R^6$ is phenyl or an optionally substituted phenyl.

In another embodiment, M is selected from the group consisting of Zr and Hf; more preferably, M is Zr. Preferably, each $R^1$ is the same and is hydrogen or alkyl alternatively, each $R^1$ is hydrogen; more preferably, each $R^1$ is methyl. In another preferred embodiment, each $R^2$, $R^3$ and $R^4$ is independently alkyl, cycloalkyl, phenyl, Si(CH$_3$)$_3$, Si(C$_6$H$_5$)$_3$, optionally substituted phenyl, alkylphenyl or optionally substituted alkylphenyl; more preferably, alkyl, cycloalkyl, phenyl, optionally substituted phenyl, alkylphenyl or optionally substituted alkylphenyl. Preferably, $R^2$ and $R^3$ are not the same. In another preferred embodiment, one $R^1$ and one of $R^2$, $R^3$ and $R^4$ together form an alkyl, aryl, arylalkyl or alkylarlylalkyl bridge; alternatively an alkyl bridge; alternatively, a trimethylene bridge, for example an "ansa-bridge." Alternatively, each $R^5$ is alkyl, cycloalkyl, optionally substituted phenyl or optionally substituted benzyl; more preferably, each $R^5$ is methyl. In another embodiment $R^6$ is pentafluorophenyl. Preferably, $[A]^+[B(R^6)_4]^-$ is $[PhNMe_2H][B(C_6F_5)_4]$.

In a more preferred embodiment of the present invention, multimodal polyolefins are prepared using at least one or more metallocene pre-catalysts, having a structure described by the formulas (III), (IV) and (V):

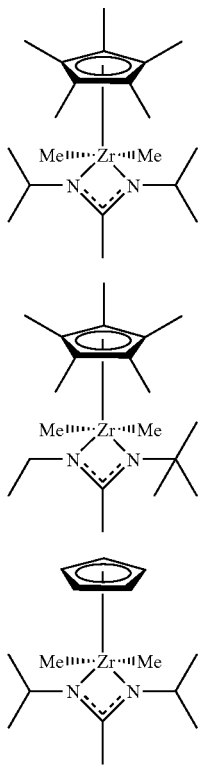

(III)

(IV)

(V)

The olefin polymerization pre-catalysts of the present invention may be prepared using any suitable olefin polymerization catalyst precursor. The olefin polymerization catalyst precursor may be made by any means available; the method of synthesis of the olefin polymerization catalyst precursor is not critical to the invention.

The olefin polymerization pre-catalyst of the present invention is converted to an activated olefin polymerization catalyst by using an activating co-catalyst. Preferably, the activating co-catalyst is one of the following: (a) ionic salts of the general formula $[A]^+[B(R^6)_4]^-$, wherein $A^+$ is a cationic Lewis or Brønsted acid capable of abstracting a methyl from the olefin polymerization pre-catalyst, B is the element boron, and $R^6$ is phenyl or an optionally substituted phenyl or (b) a boron alkyl of the general formula $B(R^6)_3$.

Examples of Lewis or Brønsted acids that may be used in the practice of the invention include, but are not limited to tetra-n-butylammonium, triphenylcarbonium and dimethylanilinium cations.

The mole ratio of olefin polymerization pre-catalyst to activating co-catalyst usefully employed in the olefin polymerization catalyst composition may vary. When the activating co-catalyst is an ionic salt of the formula $[A]^+[B(R^6)_4]^-$, or a boron alkyl of the formula $B(R^6)_3$, the mole ratio of boron atoms contained in the ionic salt or the boron alkyl to total metal atoms contained in the olefin polymerization pre-catalyst is generally in the range of from about 0.9:1 to about 1.5: 1, preferably in the range of from about 1:1 to about 1.1:1.

Particularly preferred is an olefin polymerization catalyst composition that is in unsupported, liquid form. For example, the polymerization catalyst composition may be introduced into the reaction zone in unsupported, liquid form as described in U.S. Pat. No. 5,317,036. As used herein, "unsupported, liquid form" includes liquid olefin polymerization pre-catalyst, liquid co-catalyst, solution(s) or dispersions thereof in the same or different solvent(s) (e.g., chlorobenzene, isopentane, hexane, toluene, or the like), and combinations thereof. Unsupported, liquid form catalyst compositions have a number of practical benefits. Unsupported catalyst compositions avoid the costs associated with support material and its preparation, and provide for the realization of a very high catalyst surface area to volume ratio. Furthermore, unsupported catalyst compositions produce polymers having a much lower residual ash content than polymers produced using supported catalyst compositions.

The liquid reaction medium may consist of the bulk liquid monomer or an inert liquid hydrocarbon that is nonreactive under the polymerization conditions employed. Although such an inert liquid hydrocarbon need not function as a solvent for the catalyst composition or the polymer obtained by the process, it usually serves as solvent for the monomers employed in the polymerization. Among the inert liquid hydrocarbons suitable for this purpose are chlorobenzene, dichlorobenzene, isopentane, hexane, cyclohexane, heptane, benzene, toluene, trifluorotoluene, pentane, octane, isooctane, dichloromethane and the like. Reactive contact between the olefin monomer and the catalyst composition should be maintained by constant stirring or agitation. The reaction medium containing the olefin polymer product and unreacted olefin monomer may be withdrawn from the reactor continuously. The olefin polymer product may be separated, and the unreacted olefin monomer and liquid reaction medium may be recycled into the reactor.

U.S. Pat. No. 5,912,202 teaches that polymerization may be carried out in a single reactor or in two or more reactors in series, and is conducted substantially in the absence of catalyst poisons. According to U.S. Pat. No. 5,681,908 catalyst poisons may include water, oxygen, carbon dioxide, hydrogen, sulfur and acetylene. U.S. Pat. No. 5,674,795 teaches that even minor amounts (i.e., ≦2 ppm) of such materials have been found to affect the polymerization adversely. According to the present invention, organometallic compounds may be employed as scavenging agents for poisons and to increase the catalyst activity. Examples of scavenging agents are metal alkyls, preferably aluminum alkyls, most preferably triisobutylaluminum.

Conventional adjuvants may be included in the process, provided they do not interfere with the operation of the activated olefin polymerization catalyst composition in forming the desired polyolefin. Hydrogen or a metal or non-metal hydride, e.g., a silyl hydride, may be used as a chaintransfer agent in the process.

Reaction of the olefin polymerization pre-catalyst with the activating co-catalyst may typically take place within about 10 seconds to about 30 minutes, most preferably within about 1 to about 10 minutes, at temperatures of about −35 to about 25° C., preferably about −10 to about 0° C.

In the present invention, at least one or more metallocene catalysts are used to promote the polymerization of olefin monomers to produce multimodal polyolefins. The multimodal polyolefin is produced by contacting at least one first olefin monomer with at least one first activated metallocene catalyst and polymerizing the first monomer or monomers for a sufficient time to give a first polymer. Then, adding at least one second activated metallocene catalyst, allowing the mixture to gestate for a given time, adding at least one second olefin monomer to the polymer and polymerizing the second monomer with second catalyst and the first polymer for a sufficient time produces a multimodal polyolefin.

At least about 500 equivalents of the first monomer are used compared to the first catalyst. Alternatively, at least about 100 equivalents of the first monomer are used compared to the first catalyst. Alternatively, at least about 10 equivalents of the first monomer are used compared to the first catalyst.

The first polymerization is carried out at about −30° C., alternatively about −10° C., alternatively about 0° C. The first polymerization is allowed to proceed for a time in the range from about 1 minute to about 5 minutes, alternatively from about 5 minutes to about 50 minutes, alternatively from about 50 minutes to about 100 minutes, alternatively from about 100 minutes to about 500 minutes.

The amount of second catalyst added is in the range from about 0.1% to about 1.0% of the amount of first catalyst added. Alternatively, the amount of second catalyst added is in the range from about 1.0% to about 10% of the amount of first catalyst added. Alternatively, the amount of second catalyst added is in the range from about 10% to about 50% of the amount of first catalyst added. Alternatively, the amount of second catalyst added is in the range from about 50% to about 100% of the amount of first catalyst added. Alternatively, the amount of second catalyst added is in the range from about 100% to about 500% of the amount of first catalyst added.

Before the second monomer is added, the mixture is allowed to gestate for a time period from about 0.1 minutes to about 1.0 minute. Alternatively, the mixture is allowed to gestate for a time period from about 1.0 minute to about 5 minutes. Alternatively, the mixture is allowed to gestate for a time period from about 5 minutes to about 20 minutes. Alternatively, the mixture is allowed to gestate for a time period from about 20 minutes to about 100 minutes.

The amount of second monomer added is in the range from about 500% to about 100% of the first monomer added. Alternatively, the amount of second monomer added is about 90–100% of the first monomer added. Alternatively, the amount of second monomer added is about 75–90% of the first monomer added. Alternatively, the amount of second monomer added is about 50–75% of the first monomer added. Alternatively, the amount of second monomer added is about 10–50% of the first monomer added. Alternatively, the amount of second monomer added is about 0.1–10% of the first monomer added.

In another embodiment of the invention, olefin polymerization takes place in a living fashion. For example, contacting the first olefin monomer with at least one first metallocene catalyst and polymerizing said at least one first olefin monomer forms a first living polyolefin. In another embodiment, each polyolefin chain is produced with at least one or more distinct blocks or segments. For example, in one embodiment, the segments have different molecular weights. In this example, when ethylene is used as the monomer, multimodal polyethylene is produced. In another embodiment, the segments have different molecular weights and have different tacticities. In this example, when a substituted ct-olefin is used as the monomer, such as propylene, a material is produced that has a combination of properties in addition to being multimodal, such as isotactic-poly(propylene)-block-atactic-poly(propylene), which is a multimodal thermoplastic elastomer. According to the method of the present invention, by selecting a specific catalyst combination and/or monomer combination, polymer properties can be fine-tuned to meet the needs of a given application.

Having now generally described this invention, the same will be understood by reference to the following examples which are provided herein for purposes of illustration only and are not intended to be limiting unless otherwise specified.

EXAMPLES

All synthetic manipulations were conducted in either a vacuum atmospheres glovebox or using a Schlenk line under an inert atmosphere of nitrogen. Dry, oxygen-free solventswereusedthroughout: $Et_2O$, tetrahydrofuran (THF) and pentane were distilled from sodium/benzophenone (with a few milliliters of triglyme being added to the pot in the case of pentane), and chlorobenzene was held under reflux for several days over calcium hydride before being used for polymerizations. The monomer 1-hexene (99%) was obtained from Aldrich and stirred over NaK alloy (1:1) overnight before being vacuum-transferred. Benzene-$d_6$ and toluene-$d_8$ were likewise vacuum transferred from NaK prior to being used in NMR spectroscopy. Chlorobenzene-$d_5$ was dried over CaH prior to vacuum transfer.

GPC analyses were performed using a Waters GPC system equipped with a column oven and differential refractometer both maintained at 35° C. and four columns (Waters Ultrastyragel 500 A, Waters Styragel HR3, Waters Styragel HR4, and Shodex K-806M) also maintained at 35° C. THF was used as the eluant at a flow rate of 1.1 ml/min. For PVCH homopolymers, $CHCl_3$ was used as the eluant. $M_n$ and $M_w/M_n$ values were obtained using the Waters GPC software and seven different polystyrene standards (Polymer Laboratories).

Example 1

General Procedure for the Synthesis of Oligomeric poly(1-hexene) Samples of Narrow PDI.

The catalyst was prepared in the glove box by adding a solution of 0.25 Mmol of $(\eta^5-C_5Me_5)ZrMe_2[N(Et)C(Me)N(^tBu)]$ in 2 ml of chlorobenzene precooled to −10° C., to a solution 0.25 mmol of $[PhNMe_2H][B(C_6F_5)_4]$ in 40 m of chlorobenzene also precooled to −10° C. A solution of 0.47 ml (0.32 g) of 1-hexene in 2 ml of chlorobenzene precooled to −10° C. was then added to the yellow catalyst solution and was stirred for 1 h 15 min at −10° C. The polymerization was quenched by addition of silica gel and the volatiles were removed in vacuo. Poly(1-hexene) was extracted with pentane and was precipitated into acidified methanol, isolated, and dried overnight at 70° C./0.01 mmHg.

FIG. 1 shows the $^1H$ NMR (500 MHz, $CDCl_3$) spectrum of a poly(1-hexene) sample ($M_n$=1690, PDI=1.06). The 0.8–0.9 ppm inset shows the methyl resonance for the two end-groups. The small 4.6–5.2 ppm inset is an expansion (x512) of the full spectrum, while the larger 4.6–5.2 ppm inset is that of a different spectrum taken with optimized acquisition parameters for just this region. The 4.7 ppm doublet resonance arises from β-hydride elimination, while the triplets at 5.1 and 5.18 arise from a 2.1 misinsertion followed by chain-walking and finally β-hydride elimination.

Figure 2:
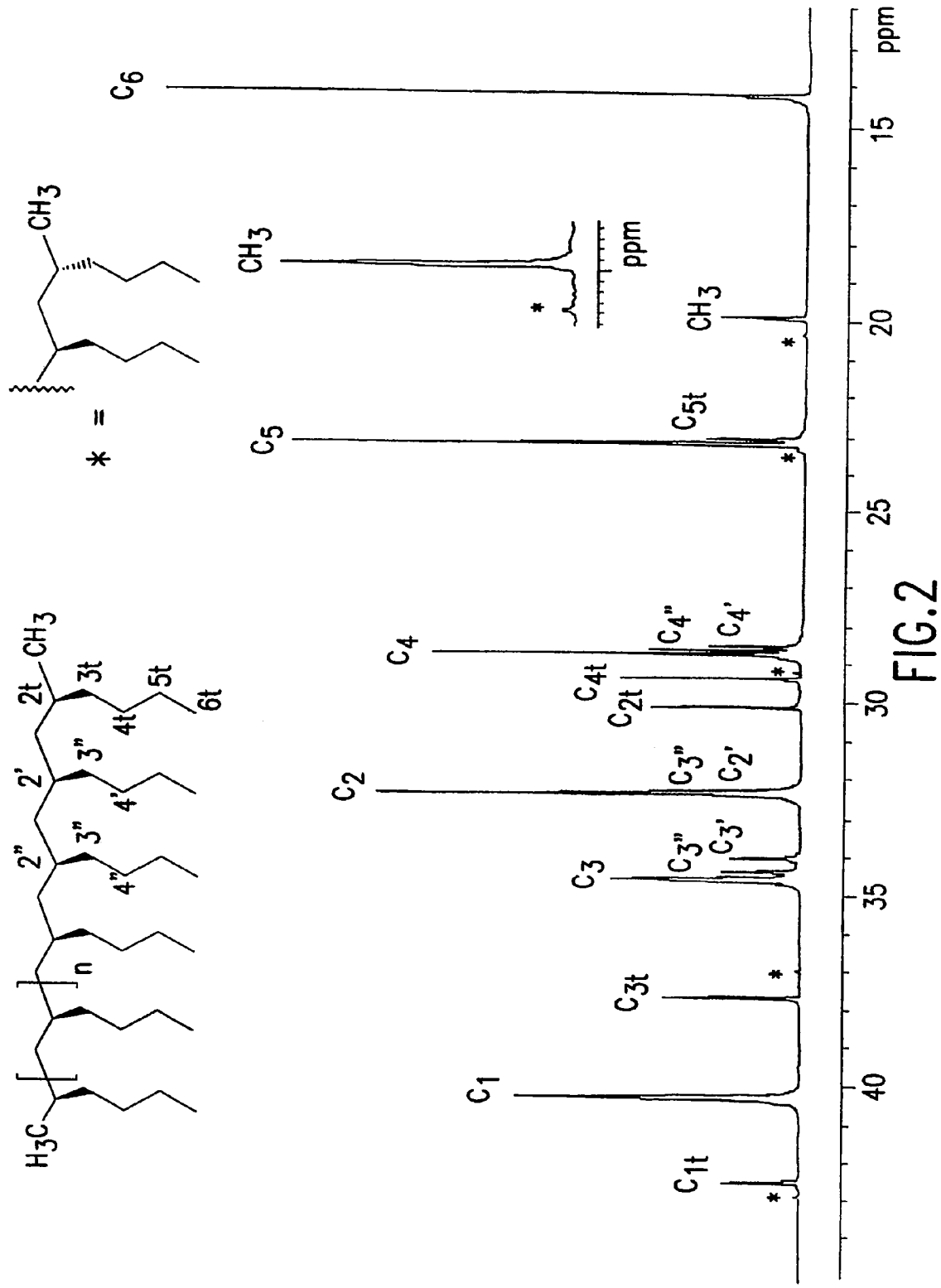
FIG. 2 shows the $^{13}$C-NMR (125 MHz, CDCl$_3$) spectrum of isotactic oligomeric poly(1-hexene) sample ($M_n$=1690, PDI=1.06).

FIG. 2 shows the $^{13}C$-NMR (125 MHz, $CDCl_3$) spectrum of isotactic oligomeric poly(1-hexene) sample ($M_n$=1690, PDI=1.06) showing complete structural assignment of resonances. Unlabeled resonances are for pentad stereoerrors. Stereoselectivity of first methyl group insertion is 95:5.

Example 2

Figure 3:
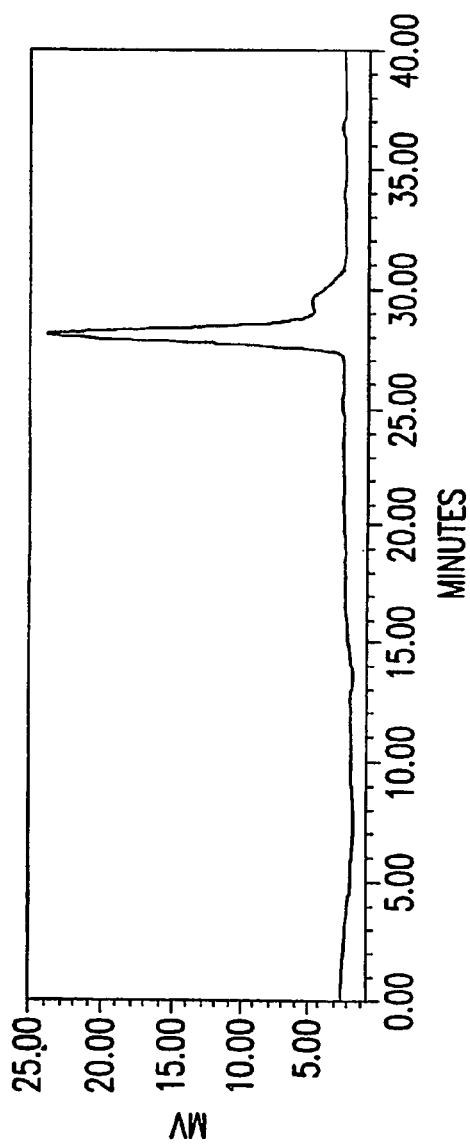
FIGS. 3–6 show GPC chromatograms of the polymers prepared in Examples 2–5, respectively. The chromatograms depict the molecular weight distribution and the polydispersity of the corresponding polymers.

The catalyst was prepared in the glove box by adding a solution of 0.025 mmol of III and 0.025 mmol of [(PhNHMe$_2$)B(C$_6$F$_5$)$_4$)] in 10.0 mL of chlorobenzene at −10° C. After five minutes, 100 eq of 1-hexene was added. After 95 minutes an additional 10% of III in 2 mL of chlorobenzene was added, and allowed to gestate for 5 minutes, after which point 50 eq. of 1-hexene was injected and the mixture was stirred for 1 h 15 mim at −10° C. The polymerization was quenched by addition of silica gel and the volatiles were removed in vacuo. The multimodal polymer was extracted with pentane and was precipitated into acidified methanol, isolated, and dried overnight at 70° C./0.01 mmHg. FIG. 3 shows the size exclusion chromatogram for the product. The chromatogram shows one major peak with a small later eluting shoulder. This represents a bimodal polymer composition of low polydispersity. ($M_n$=18,100, PDI=1.10).

Example 3

Figure 4:
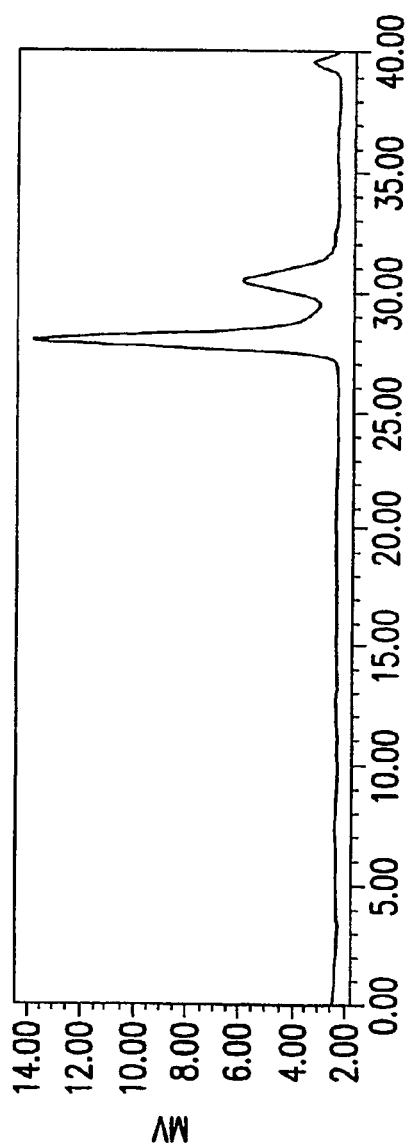

The catalyst was prepared in the glove box by adding a solution of 0.025 mmol of III and 0.025 mmol of [(PhNHMe$_2$)B(C$_6$F$_5$)$_4$)] in 10.0 mL of chlorobenzene at −10° C. After five minutes, 100 eq of 1-hexene was added. After 95 minutes an additional 100% of III in 2 mL of chlorobenzene was added, and allowed to gestate for 5 minutes, after which point 50 eq. of 1-hexene was injected and the mixture was stirred for 1 h 15 min at −10° C. The polymerization was quenched by addition of silica gel and the volatiles were removed in vacuo. The multimodal polymer was extracted with pentane and was precipitated into acidified methanol, isolated, and dried overnight at 70° C./0.01 mmHg. FIG. 4 shows the size exclusion chromatogram for the product. The chromatogram shows two distinct peaks. This represents a bimodal polymer composition of intermediate polydispersity. ($M_n$=10,700, PDI=1.39).

Example 4

Figure 5:
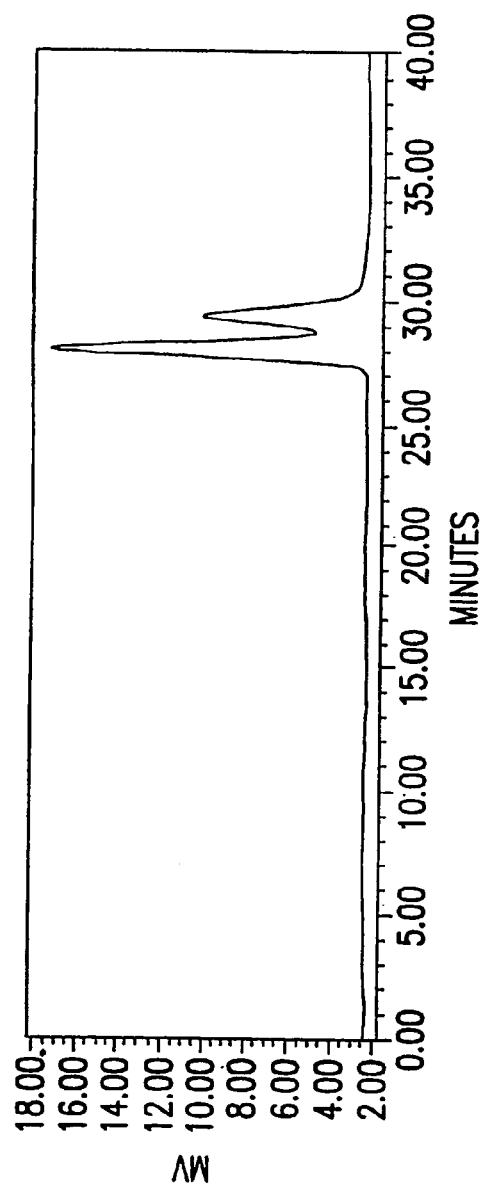

The catalyst was prepared in the glove box by adding a solution of 0.025 mmol of IV and 0.025 mmol of [(PhNHMe$_2$)B(C$_6$F$_5$)$_4$)] in 10.0 mL of chlorobenzene at −10° C. After five minutes, 100 eq of 1-hexene was added. After 95 minutes an additional 100% of III and [(PhNHMe$_2$)B(C$_6$F$_5$)$_4$)] in 2 mL of chlorobenzene was added, and allowed to gestate for 5 minutes, after which point 50 eq. of 1-hexene was injected and the mixture was stirred for 1 h 15 min at −10° C. The polymerization was quenched by addition of silica gel and the volatiles were removed in vacuo. The multimodal polymer was extracted with pentane and was precipitated into acidified methanol, isolated, and dried overnight at 70° C./0.01 nmHg. FIG. 5 shows the size exclusion chromatogram for the product. The chromatogram shows two overlapping peaks. This represents a bimodal polymer composition of low polydispersity. ($M_n$=13,600, PDI=1.16).

Example 5

Figure 6:
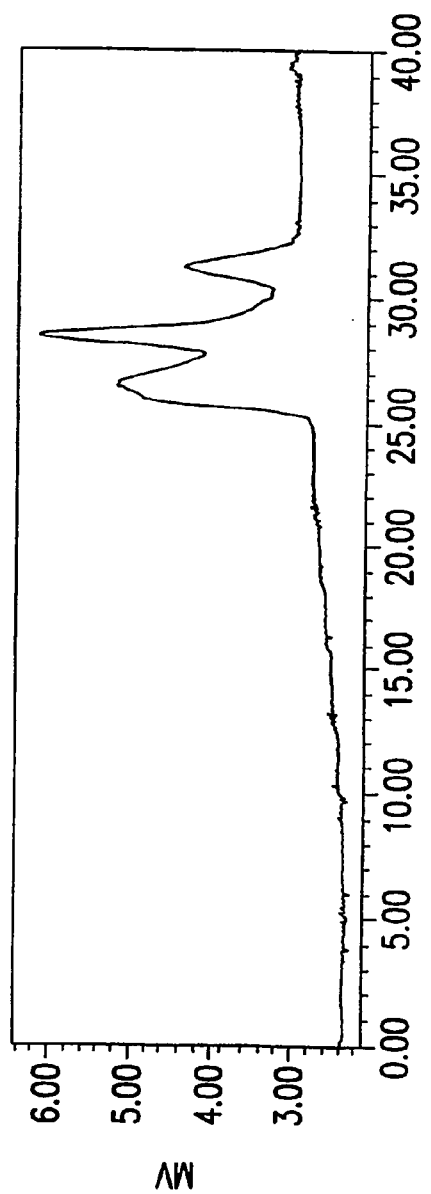

The catalyst was prepared in the glove box by adding a solution of 0.025 mmol of V and 0.025 mmol of [(PhNHMe$_2$)B(C$_6$F$_5$)$_4$)] in 10.0 mL of chlorobenzene at −10° C. After five minutes, 100 eq of 1-hexene was added. After 95 minutes an additional 100% of m and [(PhNHMe$_2$)B(C$_6$F$_5$)$_4$)] in 2 mL of chlorobenzene was added, and allowed to gestate for 5 minutes, after which point 50 eq. of 1-hexene was injected and the mixture was stirred for 1 h 15 min at −10° C. The polymerization was quenched by addition of silica gel and the volatiles were removed in vacuo. The multimodal polymer was extracted with pentane and was precipitated into acidified methanol, isolated, and dried overnight at 70° C./0.01 nmHg. FIG. 6 shows the size exclusion chromatogram for the product. The chromatogram shows three overlapping peaks. This represents a trimodal polymer composition of high polydispersity. ($M_n$=10,100, PDI=2.07).

From the foregoing description, one skilled in the art can easily ascertain the essential characteristics of this invention, and without departing from the spirit and scope thereof, can make various changes and modifications of the invention to adapt it to various usages and conditions without undue experimentation. All patents, patent applications and publications cited herein are incorporated by reference in their entirety.

What is claimed is:

1. A method of producing a multimodal polyolefin composition comprising contacting at least one first olefin monomer with at least one first metallocene catalyst; polymerizing said at least one first monomer with said at least one first metallocene catalyst for a time sufficient to give a first living polymer; adding at least one second metallocene catalyst and at least one second olefin monomer; and polymerizing said second olefin monomer with said second metallocene catalyst and said first living polymer, for a time sufficient to give a multimodal polyolefin.

2. The method of claim 1, wherein said at least one first metallocene catalyst and first olefin monomer are added in a catalyst:monomer ratio of about 1:10.

3. The method of claim 1, wherein said at least one first metallocene catalyst and first olefin monomer are added in a catalyst:monomer ratio of about 1:100.

4. The method of claim 1, wherein said at least one first metallocene catalyst and first olefin monomer are added in a catalyst:monomer ratio of about 1:1000.

5. The method of claim 1 wherein said at least one second metallocene catalyst and second olefin monomer are added in a catalyst:monomer ratio of about 1:1.

6. The method of claim 1 wherein said at least one second metallocene catalyst and second olefin monomer are added in a catalyst:monomer ratio of about 1:10.

7. The method of claim 1 wherein said at least one second metallocene catalyst and second olefin monomer are added in a catalyst:monomer ratio of about 1:100.

8. The method of claim 1, wherein said first polymer and said at least one second metallocene catalyst are allowed to gestate for a predetermined time before adding said second olefin monomer.

9. The method of claim 1, wherein said first polymer and said at least one second metallocene catalyst are allowed to gestate for about 5 minutes before adding said second olefin monomer.

10. The method of claim 1, wherein said first monomer is polymerized stereospecifically.

11. The method of claim 1, wherein said polyolefin is bimodal.

12. The method of claim 1, wherein said polyolefin is trimodal.

13. The method of claim 1, wherein said first and said second metallocene catalyst each independently have the formula:

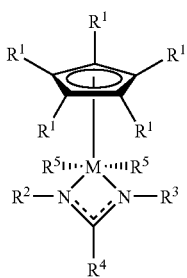

(II)

wherein the dotted lines indicate a delocalized bond;
M is Ti, Zr or Hf;
each $R^1$ is independently hydrogen or alkyl or two adjacent $R^1$ form an aromatic ring;
each $R^2$, $R^3$ and $R^4$ is independently alkyl, cycloalkyl, Si(alkyl)$_3$, Si(aryl)$_3$, optionally substituted Si(aryl)$_3$, phenyl, optionally substituted phenyl, alkylphenyl or optionally substituted alkylphenyl; or
one $R^1$ and one of $R^2$, $R^3$ and $R^4$ together form an alkyl, aryl, arylalkyl or alkylarylalkyl bridge; and
each $R^5$ is alkyl, cycloalkyl, aryl, optionally substituted aryl, arylalkyl or optionally substituted arylalkyl;
wherein said first and said second metallocene catalysts are each independently activated by reacting said metallocene catalyst with an activating co-catalyst having the formula:

$[A]^+[B(R^6)_4]^-$ or $B(R^6)_3$ wherein $A^+$ is a cationic Lewis or Brønsted acid capable of abstracting a methyl from the metal, M, of the olefin polymerization pre-catalyst;
B is the element boron; and
$R^6$ is phenyl or an optionally substituted phenyl.

14. The method of claim 13, wherein M is Zr or Hf.
15. The method of claim 14, wherein M is Zr.
16. The method of claim 13, wherein each $R^1$ is the same and is hydrogen or alkyl.
17. The method of claim 13, wherein each $R^1$ is methyl.
18. The method of claim 13, wherein each $R^2$, $R^3$ and $R^4$ is independently alkyl, cycloalkyl, phenyl, optionally substituted phenyl, alkylphenyl or optionally substituted alkylphenyl.
19. The method of claim 13 or 18, with the proviso that $R^2$ and $R^3$ are not the same.
20. The method of claim 13, wherein said alkyl, aryl, arylalkyl or alkylarylalkyl bridge is an alkyl bridge.
21. The method of claim 13, wherein said alkyl, aryl, arylalkyl or alkylarylalkyl bridge is a trimethylene bridge.
22. The method of claim 13, wherein each $R^5$ is methyl.
23. The method of claim 13, wherein the activating co-catalyst is $[A]^+[B(R^6)_4]^-$.
24. The method of claim 23, wherein the activating co-catalyst is $[PhNMe_2H][B(C_6F_5)_4]$.
25. The method of claim 13 wherein said at least one first metallocene catalyst is (1,2,3,4,5-pentamethyl)cyclopentadienyl dimethyl zirconium (N,N-isopropyl)amidinate.
26. The method of claim 13 wherein said at least one second metallocene catalyst is (1,2,3,4,5-pentamethyl)cyclopentadienyl dimethyl zirconium (N,N-isopropyl)amidinate.
27. The method of claim 13 wherein said at least one first metallocene catalyst is (1,2,3,4,5-pentamethyl)cyclopentadienyl dimethyl zirconium (N-isopropyl-N-ethyl)amidinate.
28. The method of claim 13 wherein said at least one first metallocene catalyst is cyclopentadienyl dimethyl zirconium (N,N-isopropyl)amidinate.

* * * * *